May 10, 1932.  T. F. BRACKETT  1,857,125
FRICTION BRAKE SHOE
Filed Oct. 19, 1928  2 Sheets-Sheet 1
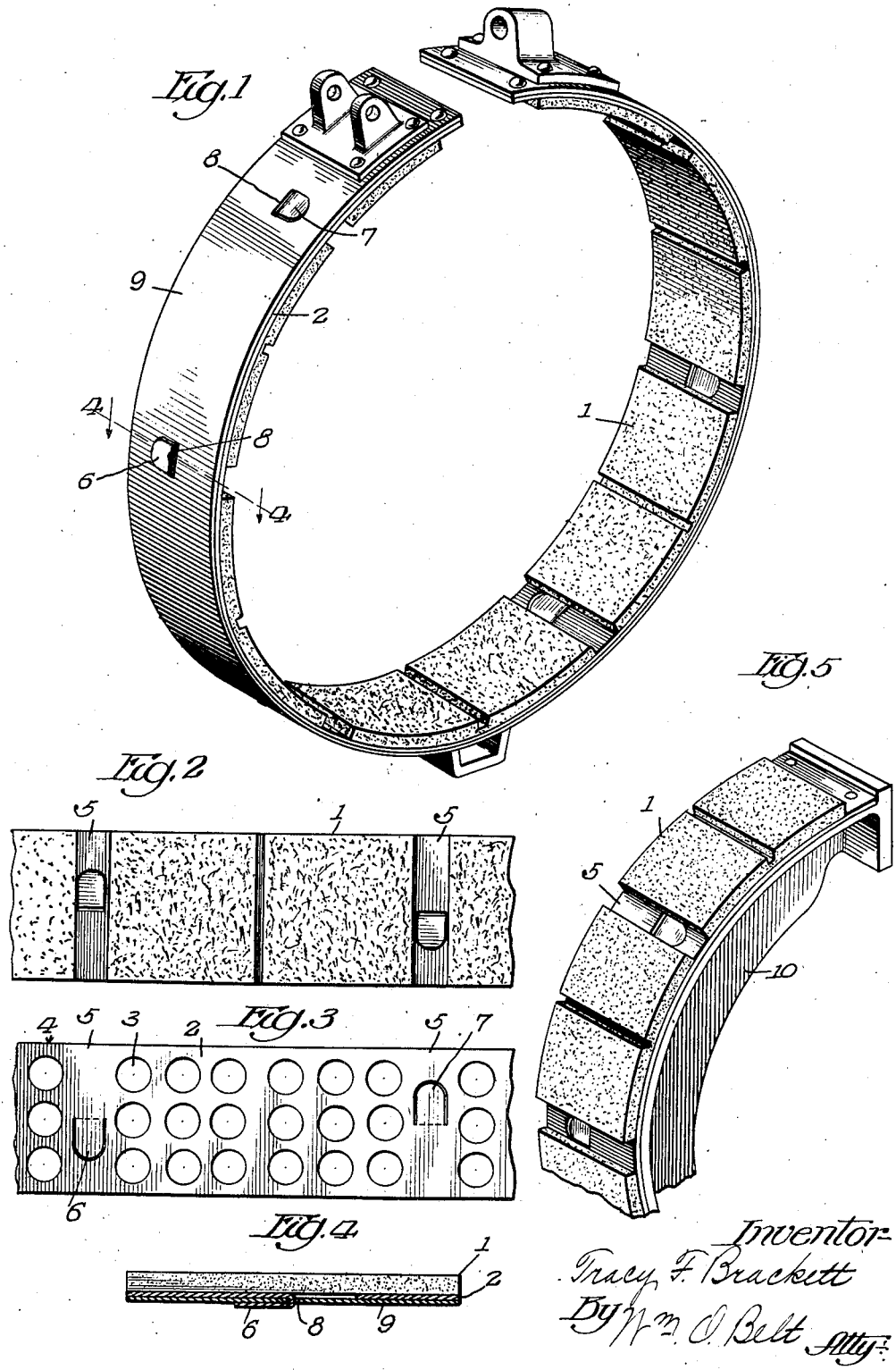
Inventor:
Tracy F. Brackett
By Wm. O. Belt Atty.

May 10, 1932. T. F. BRACKETT 1,857,125
FRICTION BRAKE SHOE
Filed Oct. 19, 1928 2 Sheets-Sheet 2
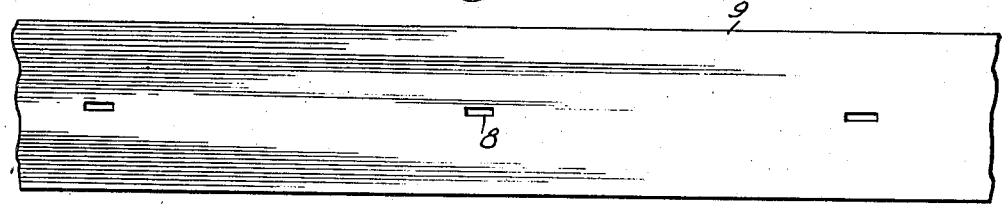
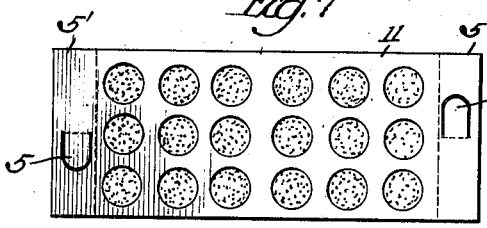
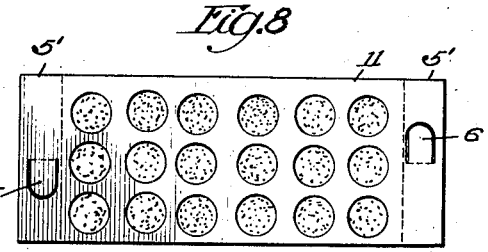
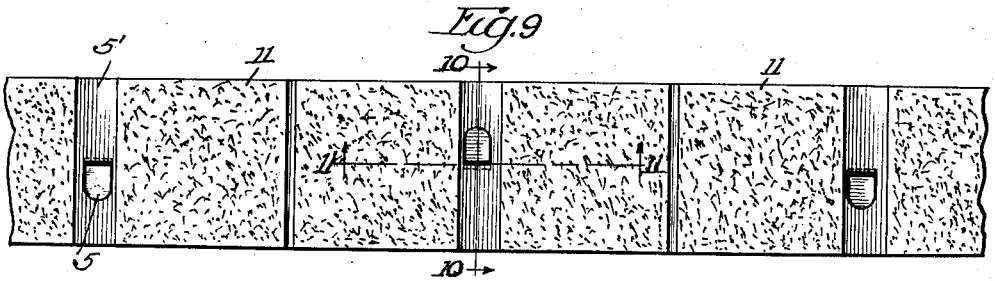
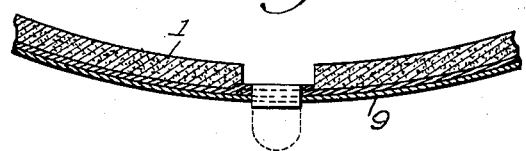
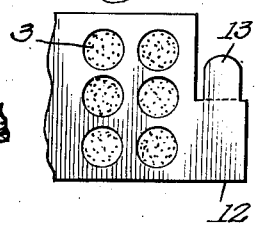
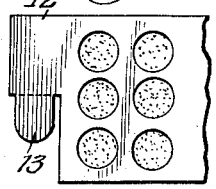
Inventor:-
Tracy F. Brackett
By Wm. J. Belt Atty Patented May 10, 1932

1,857,125

UNITED STATES PATENT OFFICE

TRACY F. BRACKETT, OF NEW YORK, N. Y., ASSIGNOR TO AMERICAN BRAKE MATERIALS CORPORATION, OF NEW YORK, N. Y., A CORPORATION OF NEW YORK

FRICTION BRAKE SHOE

Application filed October 19, 1928. Serial No. 313,509.

This invention relates to friction brakes and more particularly to friction blocks having a composition body mounted on a metal back and adapted for use on brake bands, shoes, or heads, or other supports in friction brakes of this variety.

The primary object of the invention is to provide simple means for mounting one or more blocks as units or in strip form rigidly and securely in place upon a brake band, a shoe or head or other support.

I have shown the invention in selected embodiments in the accompanying drawings in which:

Fig. 1 is a perspective view of a brake band with my invention applied thereto.

Fig. 2 is a plan view of a portion of Fig. 1 looking at the inside thereof.

Fig. 3 is a plan view of a portion of a metal back strip.

Fig. 4 is a transverse sectional view on the line 4—4 of Fig. 1.

Fig. 5 is a perspective view of a portion of a shoe or head support with my invention thereon.

Fig. 6 is a plan view of a section of the brake band flattened out.

Figs. 7 and 8 show the backs of two unit blocks as they would be arranged with relation to each other for assembly upon the band of Fig. 6.

Fig. 9 is a plan view from the body side of the blocks as they are arranged on the band in Fig. 6.

Fig. 10 is a transverse sectional view on the line 10—10 of Fig. 9.

Fig. 11 is a sectional view on the line 11—11 of Fig. 9.

Figs. 12 and 13 are detailed end views of unit blocks having different tongue construction than that shown in the other figures.

Referring to the drawings the body 1 of the friction block is made of suitable composition which will produce desired braking effect and also have long wearing quality. The back plate 2 is made of sheet metal of required gauge, size and shape having openings 3 to receive the body material for anchoring the body to the back. The blocks may be made in strip form Fig. 2 with a continuous metal back strip 4, Fig. 3 having the openings 3 disposed in a series, as shown in Fig. 3, for each body 1 to constitute, in effect, a block. The series of holes are spaced apart and the bodies are separated by the spacing to provide projecting ends 5 for the back at the ends of each body. Tongues 6, 7 are stamped from the back plate at the ends of the body and are adapted to engage slot openings 8 in a brake band 9 or in a supporting shoe or head 10. The ends of the tongues are bent down upon the outer side of the band, Fig. 1, and I prefer that the tongues should be oppositely directed and that they be bent back reversely directed when clenched upon the band for better locking engagement with the band. The tongues are attached to the back on or about the median longitudinal line of the back, and the openings 8 are correspondingly located on the support, but some variation from this arrangement is permissible if it should be found desirable for any any reason. The construction makes it necessary to provide only one slot for fastening the adjacent ends of two blocks in strip form or in unit form.

The strip form of block comprises the continuous strip back with the bodies disposed thereon in spaced relation and the exposed parts of the strip between two adjacent bodies constitutes the ends of a block, each blank space constituting adjacent ends of adjacent blocks. These strips may be made in any length and preferably in a size suitable for division as required for different supports.

When the blocks are made in separate units 11, Figs. 7 and 8, each has a projecting end 5' formed by extending the back beyond the ends of the body and in applying these unit blocks to a band 9 the blocks are preferably arranged with their ends adjacent having oppositely directed tongues so that their ends may be overlapped on the support and both tongues engaged with a single opening, Fig. 10, and adapted to be oppositely clenched upon the support Fig. 11.

Instead of providing ends of the full width of the back as shown in 5 and 5', they may be made half width as shown at 12 Figs. 12, 13 and disposed at opposite corners of each unit back so that the blocks may be used interchangeably end for end and with the projection 12 on one block lying alongside the projection 12 on the adjacent block as will be readily understood from Figs. 12, 13. The lips 13 are formed on the ends 12, at the inner sides thereof in the same position they are in the other construction so that they will engage the openings in the support as shown in Figs. 10 and 11.

My invention provides a simple and effective means for easily and conveniently securing friction blocks in strip forms or in unit form on brake bands, shoes or heads or other supports in friction brakes of this kind. The invention is particularly adapted for friction blocks intended for lighter class of work, but it may be used on blocks for heavy work if desired, with such changes in the sizes of parts and gauge of materials as may be found desirable. And I reserve the right to make all changes in the form, construction and arrangement of parts that fairly fall within the scope of the following claims:

I claim:

1. A friction block for friction brakes comprising a metal back plate and a composition body mounted thereon said back plate projecting beyond the body at the ends thereof, and a laterally extending tongue stamped from each projecting end of the block within the marginal edges thereof, the tongues of the block being oppositely directed.

2. In a friction brake, the combination of a support having openings therein, a plurality of blocks each comprising a metal back and a composition body mounted thereon, the ends of the back projecting beyond the ends of the body and, laterally extending tongues stamped transversely from the projecting ends of each back, the tongues of each block being oppositely directed and the projecting ends of the backs of adjacent blocks overlapped, the tongues of each pair of overlapped ends being engaged with a single opening in the support and oppositely bent and clenched on the support.

3. The combination of a support having openings spaced apart therein, and a friction block comprising a metal back and a body mounted thereon, said back having parts projecting beyond the body, and transverse tongues stamped from said parts, said openings being substantially equally spaced from the side edges of the support and said tongues being spaced from the side edges of the back and disposed in cooperative relation with said openings to engage said openings for securing the block to the support.

4. A friction block comprising a metal back and a body mounted thereon, said back having parts thereof projecting beyond the ends of the body at diagonally opposite corners of the back, and tongues projecting transversely of the block from the inner edges of said projecting parts.

TRACY F. BRACKETT.